United States Patent [19]
Meyer

[11] 3,760,495
[45] Sept. 25, 1973

[54] PROCESS FOR MAKING CONDUCTIVE POLYMERS

[75] Inventor: John V. Meyer, Brighton, Mass.

[73] Assignee: Texas Instruments Incorporated, Dallas, Tex.

[22] Filed: Dec. 22, 1971

[21] Appl. No.: 210,648

Related U.S. Application Data

[63] Continuation-in-part of Ser. No. 6,086, Jan. 27, 1970, Pat. No. 3,673,121.

[52] U.S. Cl.................. 29/610, 117/227, 252/511, 252/512, 252/514, 260/413, 264/104
[51] Int. Cl............................................ H01c 17/00
[58] Field of Search...................... 29/610, 612, 621; 340/207, 209, 184; 338/25, 22; 252/511, 512, 513, 514, 22; 117/227; 260/41 B; 264/104

[56] References Cited
UNITED STATES PATENTS

| | | | |
|---|---|---|---|
| 3,164,796 | 1/1965 | Dixon | 252/510 X |
| 3,243,753 | 3/1966 | Kohler | 338/31 |
| 3,414,704 | 12/1968 | Flanagan | 219/210 |
| 3,414,705 | 12/1968 | Marcoux | 219/210 |
| 3,518,407 | 6/1970 | Andrich | 219/241 X |
| 3,571,777 | 3/1971 | Tully | 338/22.R X |
| 3,617,695 | 11/1971 | Meyer et al. | 219/505 X |
| 3,619,560 | 11/1971 | Buiting et al. | 219/505 X |
| 3,689,736 | 9/1972 | Meyer | 219/505 X |

Primary Examiner—Richard J. Herbst
Assistant Examiner—Victor A. DiPalma
Attorney—Harold Levine et al.

[57] ABSTRACT

Conductive polymer having a steeply-sloped positive temperature coefficient (PTC) of resistance with a sharply defined anomaly temperature is provided by selecting a polymer having crystalline structure at room temperature, a glass transition of approximately 13°F. or lower and a narrow molecular weight distribution as measured by a flow ratio of less than 9 or a melting point range of 30° C. or less. The polymer is filled with conductive particles and may include additional additives such as stabilizing agents and flame retardants. The ingredients are mixed, subjected to shearing forces and then formed into the desired configuration. The maximum permissible processing temperature is identified for the specific polymers employed.

9 Claims, 7 Drawing Figures

PROCESS FOR MAKING CONDUCTIVE POLYMERS

This is a continuation-in-part of Ser. No. 6,086, filed Jan. 27, 1970, which issued on June 27, 1972 as U.S. Pat. No. 3,673,121.

This invention relates to electrically conductive polymer, and more particularly to polymeric material having a controlled steeply sloped positive temperature coefficient (PTC) of resistance.

An object of the invention is the provision of conductive polymeric material having an improved PTC characteristic. Another object is the provision of a method for making such material. Yet another object is the provision of PTC polymeric materials and process for making same which obviates the disadvantages of the prior art.

In the accompanying drawings, in which several of the various possible embodiments of the invention are illustrated;

Figure 2:
FIG. 2 illustrates the main process steps employed in making such an electrically conductive polymeric element.

Dimensions of certain of the parts as shown in the drawings may have been modified or exaggerated for the purpose of clarity of illustration.

The invention accordingly comprises the elements and combination of elements, compositions, methods, features of construction, and arrangements of parts which will be exemplified in the structures, steps and sequence of steps herinafter described, and the scope of the application of which will be indicated in the following claims.

Conductive polymers having a PTC effect are known in the art. See for instance U.S. Pats. Nos. 2,918,665 and 3,243,753. Such polymers are useful for instance in electrical circuits as a sensor sensing ambient temperature or as a heater with an inherent function of current limiting thereby obviating the need for thermostats or other current limiting devices. Further, polymeric materials offer the advantage of permitting relatively low cost fabrication techniques such as molding and extruding while being readily machinable. Used as a heater an element constructed out of such polymer is connected to line voltage so that current flows therethrough, causing $I^2R$ heating. When this temperature rises above the anomaly point, there is a sudden and marked increase in resistance to effectively cut off current through the heater with heat dissipation matching heat generation. Making such polymers has been a problem however since if the teaching of the prior art, such as the patents referred to supra, is followed inconsistent results are obtained. That is, although conductive polymers having a PTC effect are known, the prior art does not teach how to make conductive polymers having the desired characteristics of a controlled steeply-sloped PTC characteristic with an anomaly at a chosen temperature and with a basal (room temperature) resistivity at a desired level. Further, due to the lack of understanding of the mechanism giving rise to the PTC characteristic the prior art processing techniques have not been satisfactory. The prior art has generally taught that a PTC characteristic in conductive polymers has been caused by a difference in thermal expansion between the polymer material and the conductive filler, that is, it was believed that if the polymer had a greater thermal coefficient of expansion than the conductive filler particles, this would give rise to a PTC effect. As the temperature is raised, the polymer expands more than the conductive particles, thus spreading the conductive particles apart. However, this is not a satisfactory explanation since many materials, such as polyvinylchloride and polystyrene do not exhibit a marked PTC effect even though the thermal coefficient of expansion of the polymer is greater than the conductive particle.

Figure 1:
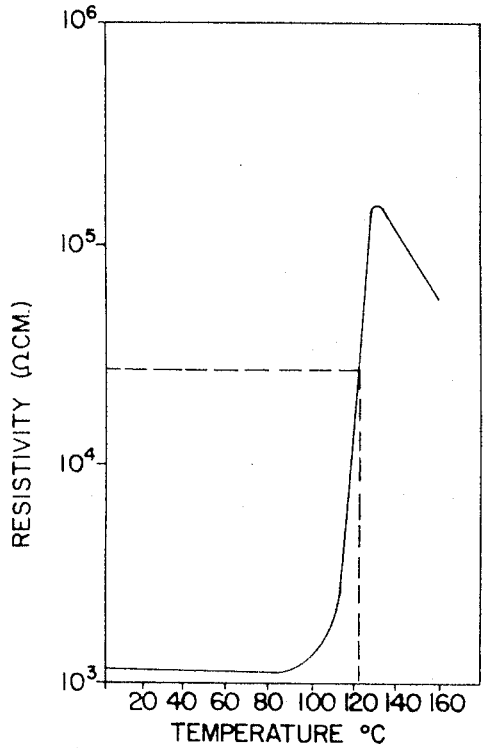
FIG. 1 is a resistivity versus temperature curve of an electrically conductive polymeric element made in accordance with this invention.

Rather than being primarily dependent upon rates of thermal expansion, the PTC effect appears related to the phase change in polymers having crystalline structure and a narrow molecular weight distribution. When a crystalline type polymer, such as polyethylene, is loaded with carbon particles, such as carbon black, the carbon black is distributed unevenly in the polymer even with extensive mixing. So called crystalline polymers include amorphous regions, normally to an extent of up to 30 percent by volume and into which the carbon particles move preferentially when the molten polymer is cooled after mixing. With the proper carbon loading and thorough dispersion, the carbon particles form large aggregates separated by crystalline regions with the separation being in the order of several hundred angstroms. The polymer will contain a few chains of carbon particles forming a continuous chain through the material but the bulk of such chains will be broken up by crystalline regions of polyethylene. Electron tunneling can occur fairly readily through thin films of crystalline polymer so that carbon chains broken up by crystalline regions have conductivities approaching those of carbon chains. As temperature rises, the carbon black masses separate due to the greater thermal expansion coefficient of the polymer compared to the carbon particles, increasing the difficulty of electron tunneling between carbon masses which offsets the increased electron tunneling effect due to temperature rise while the crystalline regions remain intact. This may be seen in FIG. 1 which is a typical temperature versus resistivity curve for a carbon loaded polyethylene polymer made in accordance with the invention. At temperatures below roughly 90° C., the resistance level is relatively flat or even decreases slightly. When the temperature rises further the carbon black masses move further apart and, more importantly, the macrostructure of the crystalline regions and at higher temperatures the microstructure, is destroyed with a concomitant reduction in the ability to allow electron tunneling. These effects, especially during the early stages of the crystalline phase change, give a resultant increase in resistivity as seen in the roughly 90° C.–130° C. range of FIG. 1. Further increase of temperature causes the crystalline regions to melt completely and the polymer to become semi-molten which permits the strained carbon masses to expand in the polymer and form a partial network of carbon through the material resulting in an increase in conductivity, as seen in FIG. 1 at temperatures above roughly 130° C.

It has been found that several factors affect the PTC characteristics of the material. The material must have crystalline structure at room temperature and a glass transition temperature of approximately 13° F. or less. Generally, the greater the crystallinity of the material and the lower the glass transition temperature the more the resistance rises with increased temperature in the anomaly range, or put in another way, the greater the resistivity ratio. The resistivity ratio is defined as the maximum resistivity divided by resistivity below the anomaly temperature. It is also found that the narrower the molecular weight distribution the sharper the knee of the PTC curve will be at this anomaly temperature.

Molecular weight distribution of polymers however is too difficult to measure for practical use. More practical indirect measures can be used, for example in olefines and similar polymers the flow ratio can be used since it is a function of molecular weight distribution. The flow ratio is the ratio of the flow rate in a standard melt index with a 10 Kg loading to the Melt Index (ASTM test D-1238). A ratio of less than 9 indicates a narrow molecular weight distribution, 9–11 indicates intermediate distribution while greater than 11 indicates a wide distribution. For certain other polymers such as nylons or rubber types, e.g., Trans 4 polybutadiene, this test is not suitable due to the high melting temperatures involved; however, these can be measured by the spread or range of the melting temperature. Material having a narrow molecular weight distribution has a melting point range within 30° C. for a polymer where the heating rate is of the order of 10° C./min. A clear peak occurs at the melting point $T_M$. The melting point range may be defined as the difference between the temperatures $T_B$ and $T_A$ which correspond with the intersection of lines, drawn tangentially on the curve at the point at which maximum slope is reached on either side of $T_M$, with the base line.

Various conductive particles can be used in the practice of the invention, such as any type of carbon particle and electrically conductive powder of materials which are not subject to oxidation at temperatures to which the material is subjected during processing. Examples of such powder include tin, silver and gold. The desired anomaly temperature can be obtained by choosing from a variety of polymers.

By controlling the above noted variables, a polymer having a much improved PTC effect compared to prior art teaching is achieved as well as enabling better control of the PTC effect as to steepness of the PTC curve above the anomaly temperature, sharpness of the knee of the PTC curve and desired anomaly temperature.

In practicing the invention, a crystalline polymer, such as a polyolefin, a conductive filler, such as a carbon black, and other additives are mixed together for several minutes in a conventional manner as in a standard V-type blender, then the resulting mixture is placed in a different mixer to effect a more complete dispersion of the fillers throughout the polymer. A standard Banbury type mixer, has been found suitable for this purpose. Essentially, it consists of two interdigitating screw-like vanes contained in a close fitting housing which also mounts a ram used to exert pressure on the mix during mixing if so desired. Heat transfer fluid can be circulated through passages in the vanes to provide heating or cooling if desired.

In order to avoid deleteriously effecting the resistance characteristics of the material, it is necessary to prevent the temperature of the mix from exceeding the temperature at which oxygen pick up increases for the particular polymer and carbon loading. In the case of polyolefin loaded with up to 30 percent by weight carbon, this maximum temperature is 350° F. That is, at temperatures above 350° F., the basal resistivity of the material begins to rise. It is also preferred to limit the mixing time in the Banbury to 5 minutes once the temperature reaches 200° F. or again the basal resistivity increases. This can be offset to some extent by increasing the carbon black content of the mix; however, as carbon black loading is increased, the strength of the material decreases as well as ultimate life. That is, the material does not have sufficient structural integrity to maintain its configuration at such loading levels.

The temperature of the material rises due to internal friction during the mixing process. Very little mixing is effected until the temperature reaches 200° F. Although the reason is not understood, it was found that initially mixing for one minute at a reduced speed of approximately 77 rpm was important in obtaining good results.

Figure 3:
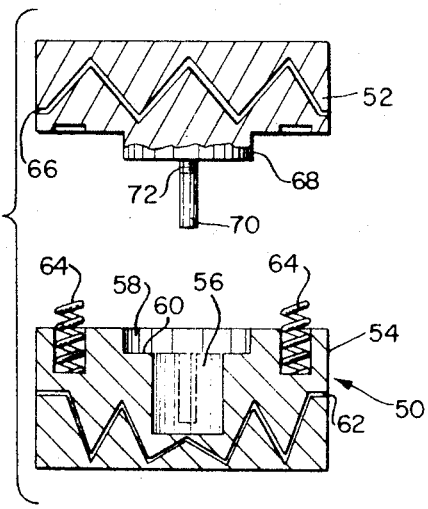
FIG. 3 is a cross section of a mold useful in forming an element from the polymeric mixture of this invention.
Figures 4, 5:
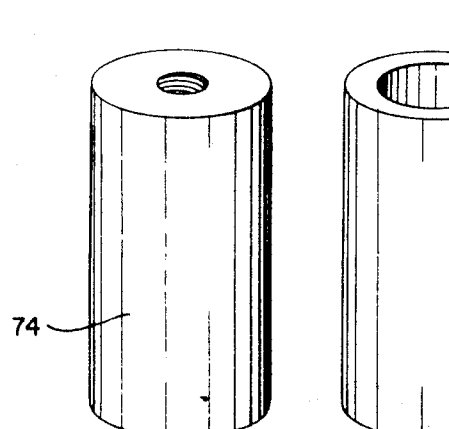
FIG. 4 is a pictorial view of polymeric form as it is removed from the FIG. 3 mold.
FIG. 5 is a pictorial view of the FIG. 4 form after it has been machined into an elongated annular element.
Figure 6:
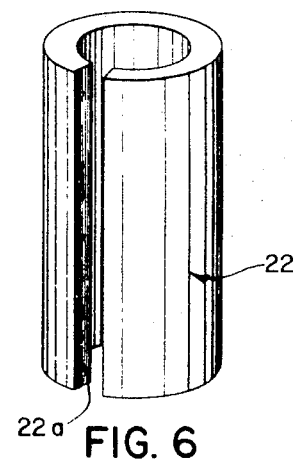
FIG. 6 is a variation of the FIG. 5 polymeric element.
Figure 7:
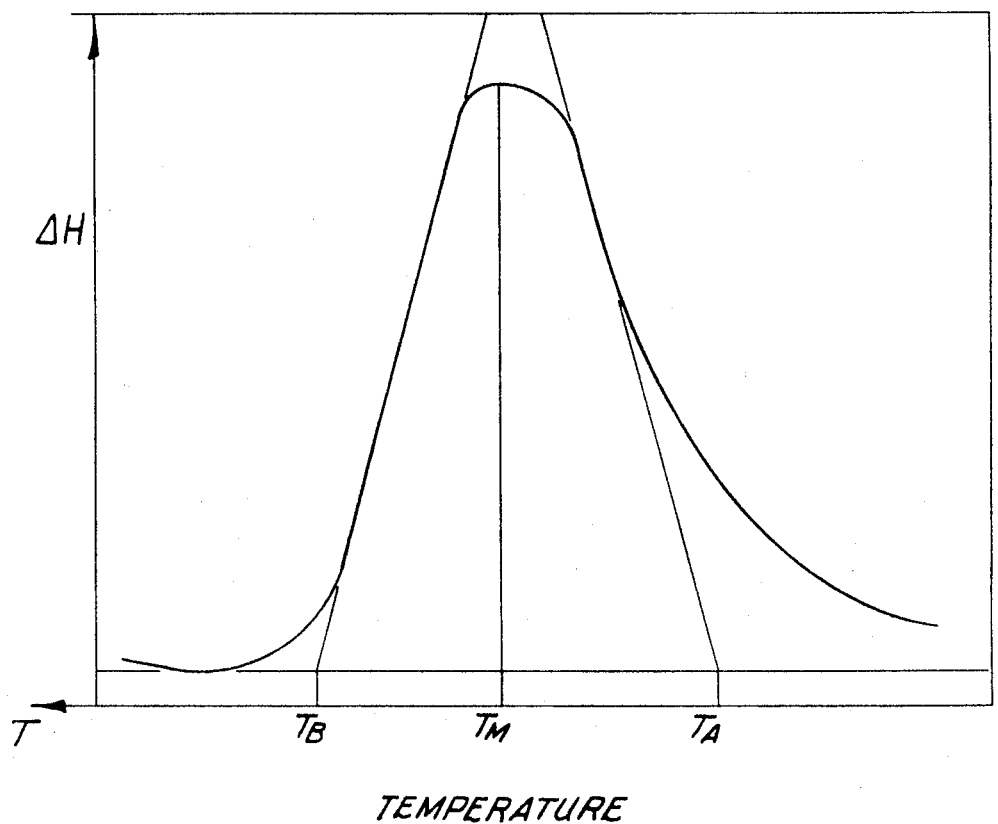
FIG. 7 is a DSC plot for a typical polymer.

As soon as the mixing step is completed, the material is transferred to a shearing apparatus, such as a two roll mill. Essentially, this comprises two rolls whose axes are mounted in parallel relation and with a variable distance between the rolls, with one roll rotating faster than the other. The rolls are heated to a temperature between 300° and 325° F. The temperature of the rolls is kept lower than in the Banbury mixer since there is a greater tendency of the polymer to oxidize due to the increased exposed surface area associated with the shearing action of the mill. Best results are obtained if one roll is kept cooler than the other, with up to 5° F. differential being acceptable. The mixing is maintained for approximately 5 minutes, with two material foldovers per minute. This is accomplished by placing a doctor against the roll, peeling the material from it and folding it over into the nip of the rolls, after which the material is ready for forming. It then can be formed by conventional thermoplastic processing into any desired configuration, such as rod or pipe, depending on the desired end use. One possible application is for a heater element for an electrically heated air curler as set forth in copending and coassigned application Ser. No. 6,095 filed Jan. 27, 1970, abandoned in favor of continuation-in-part application Ser. No. 109,414 filed Jan. 25, 1971, which issued on Sept. 5, 1972 as U.S. Pat. No. 3,689,736. For such use an elongated cylindrical annulus 22, as shown in FIG. 5, is useful. One way to make element 22 is by using mold 50 shown in FIG. 3. The mixture is taken hot from the two roll mill, roughly shaped into a cylindrical form and inserted into a mold cavity 56, as seen in FIG. 3. This is done before the mixture has had a chance to cool in order to avoid the formation of air bubbles in the mold. The mold is closed and pressure applied. Mold 50 is formed of platen 52 and bed member 54. Bed member 54 is formed with a cylindrically shaped mold cavity 56. An enlarged portion 58 communicates with cavity 56 and forms shelf 60. Passageway 62 which extends through bed member 54 permits passage of a heat exchange medium therethrough. Mold release members 64 are mounted in bed member 54 to facilitate movement of platen 52 away from the bed member for removal of the molded element. Another passageway 66, similar to and for the same purpose as passageway 62, is provided in platen 52. Cylindrical hub 68 formed on platen 52 closely fits into cavity 58 and rests in surface 60 when fully lowered. Core member 70 extends from hub 68 and is provided primarily as a heat conducting member to conduct heat into the inner portions of the annular polymeric material. When in the lowered position in mold cavity 56, as seen in dashed lines, it will be noted that a slight clearance is provided. The upper portion 72 of core 70 is threaded to facilitate handling of the polymeric element once molded. The molded element is depicted in FIG. 4 as element 74. Element 74, after removing from the mold, is then machined into the elongated annulus 22 shown in FIG. 5 by boring it out. Preferably, a rough machined finish is provided on element 22 both on the inner end and outer peripheral surfaces 76, 78 respectively, to facilitate adherence of an electrically conductive coating placed thereon. In instances where a particularly high number of heating cycles are required, it is useful to provide an axial slit 22a as seen in FIG. 6, which mitigates the effect of thermal stress due to repeated expansion and contraction of the element.

Such an annulus may also be produced by extrusion of a pipe which is then cut to size. Standard extruding equipment may be used. The polymer should be dry prior to extrusion. Care must be taken to prevent sticking in the sizing die caused by the condensation on the cold die of stabilizer degradation products released during extrusion. When extrusion is completed and the pipe is cut to size the resistance of the core produced is orders of magnitude greater than desired. It has been found that in order to produce a useful core the material must be heated after extrusion to 110° C. for at least 36 hours after which time the resistance is at the desired value. Higher temperatures reguire a shorter heating period but the cores tend to deform. While a lower temperature of 80° C. is possible for the annealing, the time required is excessive.

For most uses, several additives to the mixture are found to be beneficial. For instance, it is found that eventually some degradation of the PTC characteristic occurs in the material. This is referred to as aging. The effect is related to a change in form of the crystalline regions brought on by oxidation. It manifests itself by continuing increase in room temperature resistivity and ultimately the disappearance of the PTC anomaly. Certain stabilizing agents materially delay the occurrence of aging in the material. While there are many stabilizers used in polymers, most are not suitable for conductive polymers. An alkylated polyhydroxy phenol, such as Santovar A, a product of Monsanto Chemical Co., is very effective, especially when polyethylene is used as the polymer. Phenylbetanapthylamine, such as Antioxygene MC of Ugine-Kuhlmann, Organic Products Division of F.M.C. s.a., of France is also effective in stabilizing the resistance characteristics and reduces sticking problems during extrusion. Unlike Santovar A, its decomposition products do not condense on the sizing die. These additions stabilize the basal resistivity but does not materially effect the PTC characteristic. However, since the decomposition products are rather volatile, care must be exercised in processing to reduce losses of the additive. Dialkyl phenol-sulfide, such as Santowhite, also a product of Monsanto Chemical Co., is found to be acceptable for reducing degradation at a metal polymer interface thus reducing contact resistance and is particularly useful if the elements formed from the mixture are to be plated with copper.

Another characteristic that many polymers have that is undesirable for many applications is that they are not self-extinguishing if heated to the combustion temperature through overheating. It is found that antimony oxide is effective in making the material self-extinguishing, that is, once the heat source is removed (whether it be external or internal through $I^2R$ heating), the material will not continue to burn. A highly chlorinated perchloropentacyclodecane, such as Dechlorane plus 25 of Hooker Chemical Company is found to be effective. The Dechlorane 125 to be effective, however, must be used with antimony oxide. Specifically, it should be noted that although antimony oxide and Dechlorane 125 are effective when used in high density polyethylene, the amounts of these fillers to be used are determined by the amount of conductive filler employed. The total filler used in the mixture should not exceed 50 percent or the strength will be notably effected. It has been found that in general as much flame retardant should be added as is consistent with maintaining structural integrity of the filled material. An optimum percentage of filler material (carbon black, stabilizers and flame retardants) is 40 percent. The amount of conductive filler is determined by the warm-up time desired.

The range of carbon black useful in making such heaters include 14 to 30 percent by weight of the carbon black plus the polymer with a preferred range of 14 to 20 percent. The percentage of carbon black filler is selected and then the amounts of other additives are calculated from a chosen level of fillers.

Polymers useful in producing PTC elements having a high resistivity ratio (over approximately 3,000 which is required for self control or current limiting) are shown in Table I with their approximate oxygen pick up temperature for the preferred carbon loading of 14–20 percent and their glass transition temperature.

TABLE I

| Polymer | Approximate oxygen pick up temp. (°F.) | Glass transition temp. (°F.) |
|---|---|---|
| Low Density Polyethylene | 320 | −130 |
| High Density Polyethylene | 350 | −193 |
| Polypropylene | 420 | −4 |
| Polyethylene Oxide | 190 | −106.6 |
| Trans 4 Polybutadiene | 300 | −4 |
| Polyethyl Acrylate | 350 | −11.2 |

Specific examples illustrative of the invention are given below.

EXAMPLE I

To produce an electric curler heater having a 2 ½ minute warm-up time, that is the time necessary for the surface temperature of the central portion of the curler to reach 62° C. using 120 volt supply, one was prepared from a batch consisting of 1,356 grams: 264 grams of oil furnace carbon black (Vulcan 3 of Cabot Corporation) having an average particle size of 30 millimicrons, 108 grams antioxidant (Santovar A), 96 grams of Dechlorane 125 flame retardant, 48 grams of antimony oxide flame retardant and 840 grams of high density polyethylene (Alathon 7,030 of E.I. DuPont deNemours & Co., Inc.) were added in the order recited in a V blender for several minutes. The resultant blend was added to a Banbury mixer at a load speed of 77 rpm for 1 minute in four equal batches, the ram lowered at 40 psi and speed raised to 116 rpm for 5 minutes after the blend had reached its minimum volume (when the ram bottoms). Cooling water was circulated through the mixing blades to keep temperature below 350° F. except for the last 2 minutes when the cooling water was turned off. The temperature remained below 350° F. The material was then placed in a two roll mill with the rolls heated to a temperature of 308° and 305° F. respectively. The rolls were initially set at 0.200 inches until the material was molten, then the space between the rolls was reduced to 0.110 inches. The material was milled for 5 minutes with two material foldovers per minute. The material was taken in approximately 140 gram quantities still hot from the two roll mill, roughly shaped by hand and placed in the mold cavity (as seen in FIG. 4) which was preheated to 300° F. The mold was closed and pressure increased gradually to 50 tons in 1 ½ minutes. The pressure was maintained for 5 minutes. Cooling water was then circulated through the mold while pressure was maintained, until temperature decreased below 100° F. The mold was opened and the piece removed. The molded piece was then machined to produce an annulus or tubular cylinder of the following approximate dimensions: outside diameter 17.55 mm., inside diameter 5 mm. and length 55 mm.

EXAMPLE II

Same as Example I except that a hair curler heater having a warm-up time of 1 minute with a 120 volt supply was prepared in a batch of 1,356 grams; 276 grams of oil furnace carbon black, 828 grams of high density polyethylene with the remainder of the ingredients being the same.

EXAMPLE III

Same as Example II except that a hair curler heater having a warm-up time of 0.5 minutes with a 240 volt supply was prepared.

EXAMPLE IV 50 pounds of a blend containing, on a weight basis, 15 percent of furnace oil carbon black having an average particle size of 30 millimicrons (Vulcan 3 of Cabot Corporation), 8 percent of antioxidant (Santovar A of Monsanto Inc.), 8 percent of antimony oxide and 4 percent of flame retardant (Dechlorane 125 of Hooker Chemical) and the remainder high density polyethylene was prepared by mixing in a Banbury mixer keeping temperature below 350° F. The blend was then two roll milled and pelletized. The resultant material was extruded on a standard extruder as described on page 9 and the resultant pipe cut to size. The cores produced were heated at 110° C. for 30 hours. These cores had a resistance of about 50 ohms and were useful as hair curler heaters having a warm up time of 1 minute.

EXAMPLE V

Same as Example IV except that the mix contained 23 percent furnace oil carbon black (Vulcan 3) and 77 percent polypropylene. The temperature was kept below 420° F. and the resultant core had a resistance of 75 ohms.

EXAMPLE VI

Same as Example IV except that the mix contained 30 percent carbon black (Elftex-5) and 70 percent trans 4 polybutadiene. The temperature was kept below 300° F. and the resultant core had a resistance of 6,000 ohms.

In all of the above examples the resistance ratio was observed to be above 3,000.

The heaters were then coated on the inner and outer peripheral surfaces with an electrically conductive coating, such as electroless nickel and electroplated tin, as described more fully in copending coassigned application Ser. No. 6,093 filed Jan. 27, 1970, now abandoned, or electroless copper.

After coating with conductive coatings including a layer of electroless nickel, optimum low contact resistance between the electroless nickel coating and the polymer material was obtained by annealing the heaters for at least two days and at a temperature up to 110° C. Actually higher temperatures would be useful, however, the heaters begin to physically deform at temperatures above 110° C. Electroless copper coating obviates the necessity of this annealing. The cores from Example IV were plated with electroless copper using conventional techniques and did not require this annealing stage.

In view of the above, it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. The method of making electrical resistance elements having a steeply sloped positive temperature coefficient of resistance above an anomaly temperature comprising selecting a polymer having crystalline structure at a temperature below said anomaly temperature, said polymer having a glass transition temperature lower than approximately 13° Fahrenheit, mixing said polymer with conductive particles, forming the resultant mix into an element of a desired configuration, and applying electrical contacts to spaced portions of the formed element.

2. The method according to claim 1 in which the temperature of the mix is maintained below the oxygen pick up temperature for the polymer employed.

3. The method according to claim 1 further including providing a sharp transition between the resistance level at a temperature below the anomaly and the steeply sloped portion of the resistance temperature curve at temperatures above the anomaly by choosing a polymer having a narrow molecular weight distribution.

4. The method according to claim 3 in which the polymer has a flow ratio of less than 9.

5. The method according to claim 3 in which the polymer has a melting temperature range within approximately 30° Centigrade.

6. The method according to claim 1 in which the conductive filler is carbon black from 14 to 20 percent by weight.

7. The method according to claim 1 in which the polymer is selected from the group consisting of high density polyethylene, low density polyethylene, polypropylene, polyethylene oxide, trans 4 polybutadiene and a mixture of polyethylene and polyethyl acrylate.

8. The method according to claim 1 in which the conductive particles are selected from the group consisting of carbon, tin, silver and gold.

9. The method according to claim 7 in which the approximate maximum processing temperatures for the group of polymers are 350° F., 320° F., 420° F., 190° F., 300° F. and 350° F. respectively.

* * * * *